(12) United States Patent
Tan et al.

(10) Patent No.: US 12,306,359 B2
(45) Date of Patent: May 20, 2025

(54) AREA ARRAY DETECTOR, DETECTION METHOD, AND CORRESPONDING CONTAINER/VEHICLE INSPECTION SYSTEM

(71) Applicant: NUCTECH COMPANY LIMITED, Beijing (CN)

(72) Inventors: Linxia Tan, Beijing (CN); Hao Yu, Beijing (CN); Xiang Zou, Beijing (CN); Weibin Zhu, Beijing (CN); Junxiao Wang, Beijing (CN)

(73) Assignee: NUCTECH COMPANY LIMITED, Beijing (CN)

(*) Notice: Subject to any disclaimer, the term of this patent is extended or adjusted under 35 U.S.C. 154(b) by 246 days.

(21) Appl. No.: 17/994,364

(22) Filed: Nov. 27, 2022

(65) Prior Publication Data
US 2023/0168397 A1  Jun. 1, 2023

(30) Foreign Application Priority Data
Nov. 26, 2021 (CN) .......... 202111422301.X (51) Int. Cl.
*G01T 1/20* (2006.01)
*G01T 1/29* (2006.01)
*G01V 5/226* (2024.01)

(52) U.S. Cl.
CPC .......... *G01T 1/2985* (2013.01); *G01T 1/2018* (2013.01); *G01V 5/226* (2024.01)

(58) Field of Classification Search
None
See application file for complete search history.

(56) References Cited

U.S. PATENT DOCUMENTS

| | | | | |
|---|---|---|---|---|
| 8,320,523 B2* | 11/2012 | Zhang | ...... | G01V 5/00 |
| | | | | 378/53 |
| 9,442,212 B2* | 9/2016 | Yi | ...... | G01V 5/223 |
| 10,416,344 B2* | 9/2019 | Miao | ...... | G01V 5/224 |
| 2012/0145911 A1 | 6/2012 | Suyama | | |
| 2014/0369458 A1 | 12/2014 | Shen et al. | | |
| 2015/0378047 A1* | 12/2015 | Chen | ...... | G01V 5/226 |
| | | | | 250/394 |
| 2016/0223706 A1* | 8/2016 | Franco | ...... | G01V 5/224 |

(Continued)

FOREIGN PATENT DOCUMENTS

| | | | |
|---|---|---|---|
| CN | 1242519 A | 1/2000 | |
| CN | 1460849 A | 12/2003 | |

(Continued)

OTHER PUBLICATIONS

European Search Report mailed Apr. 13, 2023 regarding EP Application No. 22209595.2.

(Continued)

*Primary Examiner* — Marcus H Taningco (57) ABSTRACT

This disclosure provides an area array detector, a detection method, and a corresponding container/vehicle inspection system, and relates to the field of ray scanning. The area array detector for the container/vehicle inspection system includes sparsely arranged detector assemblies, and a first detector assembly is different from other second detector assemblies; and a backplane for carrying and mounting detector assemblies, and the area array detector supporting scanning modes is enabled.

17 Claims, 5 Drawing Sheets

(56) References Cited

U.S. PATENT DOCUMENTS

| | | |
|---|---|---|
| 2018/0182085 A1 | 6/2018 | Zhao et al. |
| 2019/0120977 A1* | 4/2019 | Jacobs ............ G01T 1/20188 |
| 2020/0158909 A1 | 5/2020 | Morton |
| 2021/0072410 A1 | 3/2021 | Yu et al. |

FOREIGN PATENT DOCUMENTS

| | | |
|---|---|---|
| CN | 2677923 Y | 2/2005 |
| CN | 202948145 U | 5/2013 |
| CN | 105807329 A | 7/2016 |
| CN | 108240997 A | 7/2018 |
| CN | 111157555 A | 5/2020 |
| CN | 211749672 U | 10/2020 |
| CN | 113133772 A | 7/2021 |
| CN | 113406710 A | 9/2021 |
| EP | 1176432 A2 | 1/2002 |
| EP | 2960686 B1 | 5/2019 |
| EP | 3901669 A1 | 10/2021 |
| GB | 2368764 A | 5/2002 |
| JP | 2005534009 A | 11/2005 |
| JP | 2011064640 A | 3/2011 |
| JP | 2018050896 A | 4/2018 |
| JP | 2021043201 A | 3/2021 |
| TW | 201132965 A | 10/2011 |
| WO | 2004010127 A1 | 1/2004 |
| WO | 2013165396 A1 | 11/2013 |
| WO | 2021185242 A1 | 9/2021 |

OTHER PUBLICATIONS

ISR mailed Jan. 28, 2023 for PCT No. PCT/CN2022/128923.
JP OA received in Application No. 2022-187902; mailed Nov. 5, 2024.

\* cited by examiner

AREA ARRAY DETECTOR, DETECTION METHOD, AND CORRESPONDING CONTAINER/VEHICLE INSPECTION SYSTEM

CROSS-REFERENCES TO RELATED APPLICATIONS

The present disclosure is based on and claims priority of Chinese application for invention No. 202111422301.X, filed on Nov. 26, 2021, the disclosure of which is hereby incorporated into this disclosure by reference in its entirety.

FIELD

This disclosure relates to the field of ray scanning, and particularly, to an area array detector for a container/vehicle inspection system, the container/vehicle inspection system using the area array detector, and a corresponding detection method.

BACKGROUND

In the related art, there are detectors for DR (Digital Radiography) scanning, and also detectors for CT (Computed Tomography) scanning. The detectors for DR scanning are in fewer detector rows, and the rows of detectors are arranged continuously. The detectors for CT scanning are in a small overall size, and rows of detectors use the same scintillator. Each kind of detector equipment supports one scanning mode.

SUMMARY

In embodiments of the present disclosure, there is provided an area array detector for a container/vehicle inspection system, which through a backplane carries sparsely arranged detector assemblies, and a first detector assembly is different from other second detector assemblies. Detection data of the first detector assembly or detection data of all the detector assemblies can be outputted according to needs of scanning modes, for imaging in a corresponding scanning mode, and the area array detector supporting scanning modes is enabled.

In some embodiments of the present disclosure, there is provided an area array detector for a container/vehicle inspection system, comprising: sparsely arranged detector assemblies, and a first detector assembly is different from other second detector assemblies; and a backplane for carrying and mounting detector assemblies.

In some embodiments, the first detector assembly and the second detector assembly have different scintillator arrays.

In some embodiments, the scintillator arrays of the first detector assembly and the second detector assembly differ in at least one of a pixel size or material.

In some embodiments, a preset number of adjacently arranged detector assemblies are disposed inside one detector housing to form one independent detector unit with an all-sealed structure, the detector unit being seal mounted with the backplane.

In some embodiments, the preset number includes 2.

In some embodiments, the area array detector further includes a filler assembly, and the filler assembly and a detector assembly arranged adjacent to the filler assembly are disposed inside one detector housing to form one independent detector unit with an all-sealed structure, the detector unit being seal mounted with the backplane.

In some embodiments, the backplane is a planar backplane or a curved backplane.

In some embodiments, in the case of the curved backplane, detector assemblies are arranged on a curved surface of the curved backplane, and detection sensitive surfaces of detector assemblies are curved and aligned with a ray source located in a central area of the curved surface.

In some embodiments, a first pixel size of the scintillator array of the first detector assembly is less than a second pixel size of the scintillator array of the second detector assembly.

In some embodiments, the area array detectors are spliced into a larger area array detector.

In some embodiments, the area array detector further includes a data acquisition circuit board configured to acquire detection data of detector assemblies, and according to different scanning modes, output the detection data of the first detector assembly or the detection data of all the detector assemblies for imaging in a corresponding scanning mode.

In some embodiments, the data acquisition circuit board is configured to output the detection data of the first detector assembly for DR imaging in a digital radiography DR scanning mode, and output the detection data of all the detector assemblies for CT imaging in a computed tomography CT scanning mode.

In some embodiments of the present disclosure, there is provided a container/vehicle inspection system, comprising the area array detector.

In some embodiments of the present disclosure, there is provided a detection method, comprising:
acquiring detection data of sparsely arranged detector assemblies, and a first detector assembly in detector assemblies is different from other second detector assemblies; and
according to different scanning modes, outputting the detection data of the first detector assembly or the detection data of all the detector assemblies for imaging in a corresponding scanning mode.

In some embodiments, in the case of a DR scanning mode, the detection data of the first detector assembly is output for DR imaging, and in the case of a CT scanning mode, the detection data of all the detector assemblies is output for CT imaging.

In some embodiments, the DR scanning mode is performed first, and is switched to the CT scanning mode when a suspicious substance difficult to distinguish is found.

BRIEF DESCRIPTION OF THE DRAWINGS

The accompanying drawings that need to be used in the description of the embodiments or the related art will be briefly described below. The present disclosure will be more clearly understood according to the following detailed description, which proceeds with reference to the accompanying drawings.

DETAILED DESCRIPTION OF THE DISCLOSURE

The embodiments of the present disclosure will be clearly and completely described below with reference to the drawings in the embodiments of the present disclosure.

Unless specifically stated otherwise, the descriptions of "first", "second", etc. in this disclosure are used for distinguishing different objects, and are not used for indicating the meaning of size or timing, etc.

Figure 1:
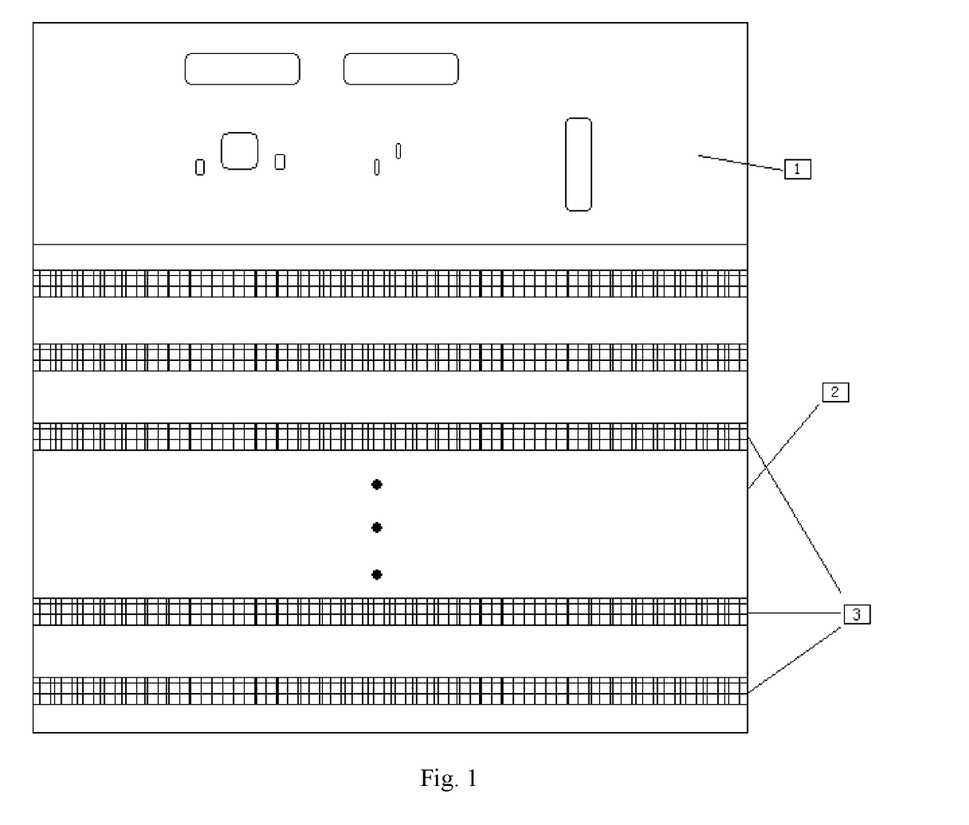
FIG. 1 illustrates a front view of an area array detector according to some embodiments of the present disclosure.

FIG. 1 illustrates a front view of an area array detector according to some embodiments of the present disclosure.

Figure 2:
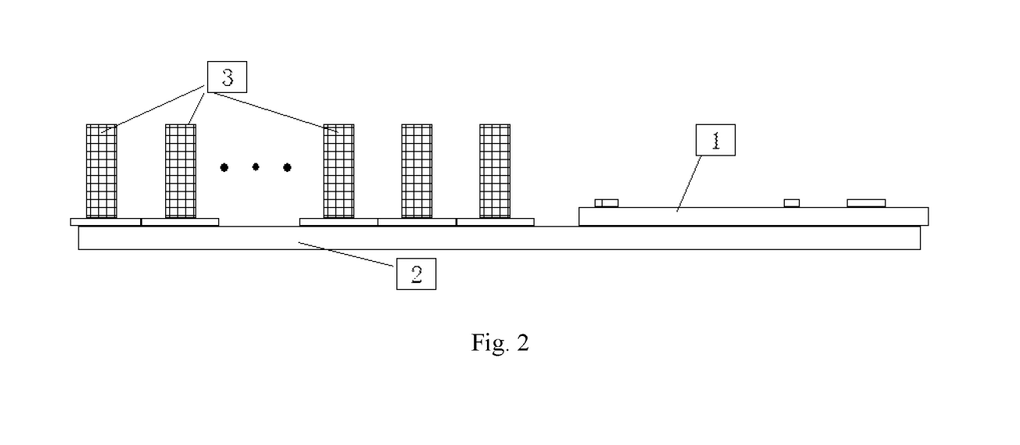
FIG. 2 illustrates a side view of an area array detector according to some embodiments of the present disclosure.

FIG. 2 illustrates a side view of an area array detector according to some embodiments of the present disclosure.

As shown in FIGS. 1 and 2, the area array detector of this embodiment includes, for example: a data acquisition circuit board 1, a backplane 2, sparsely arranged detector assemblies 3, and the like. The backplane 2 is used for carrying and mounting detector assemblies 3 and the data acquisition circuit board 1. The number of the detector assemblies and a space between different detector assemblies can be configured and adjusted according to actual business needs.

Figure 3:
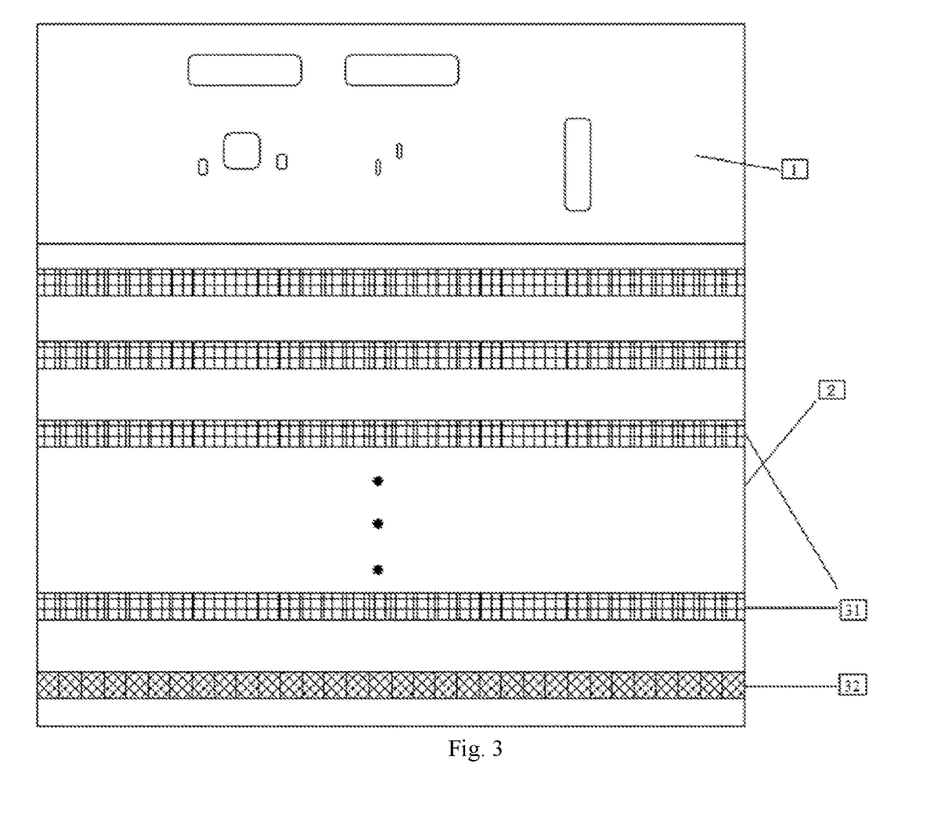
FIG. 3 illustrates a schematic diagram of an area array detector having a detector assembly different from other detector assemblies according to some embodiments of the present disclosure.

In the sparsely arranged plurality of detector assemblies 3, a first detector assembly 32 is different from other second detector assemblies 31, for example, they have different scintillator arrays. The scintillator arrays of the first detector assembly 32 and each second detector assembly 31 differ in at least one of a pixel size or material. For example, the first detector assembly 32 includes a scintillator array in a first pixel size and a matched optoelectronic device, and the second detector assembly 31 includes a scintillator array in a second pixel size and a matched optoelectronic device, and the first pixel size is less than the second pixel size, for example, the first pixel size is ¼ of the second pixel size, and imaging with higher resolution is achieved by using a detector assembly in the smaller pixel size. The scintillator array of the first detector assembly 32 is, for example, a GAGG (Gadolinium Aluminum Gallium Garnet) scintillator array. The scintillator array of the second detector assembly 31 is, for example, a cesium iodide scintillator array. Reference is made to FIG. 3, which illustrates a schematic diagram of the first detector assembly 32 being located in a first row, however, it is appreciated that the arrangement location of the first detector assembly 32 is not limited in the present disclosure.

Figure 4:
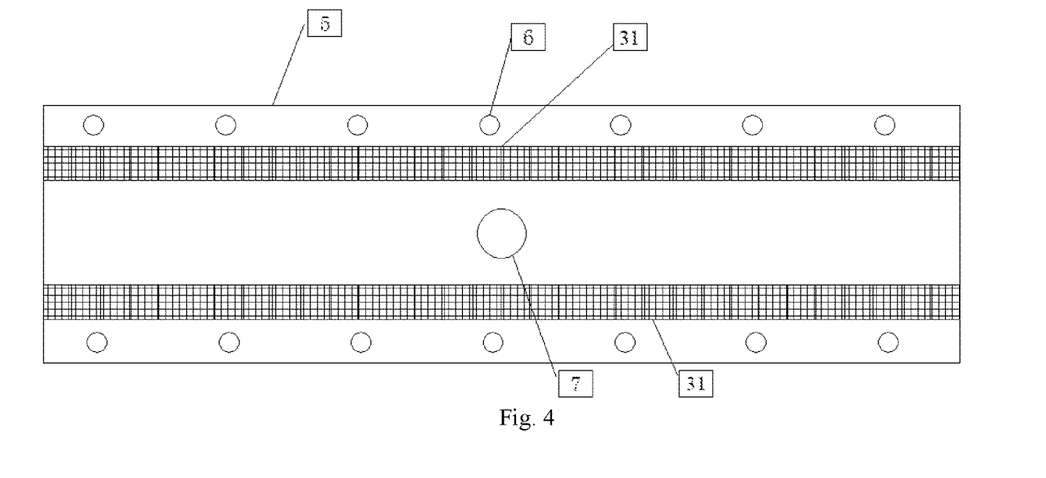
FIGS. 4 and 5 illustrate schematic diagrams of a detector unit according to some embodiments of the present disclosure.
Figure 5:
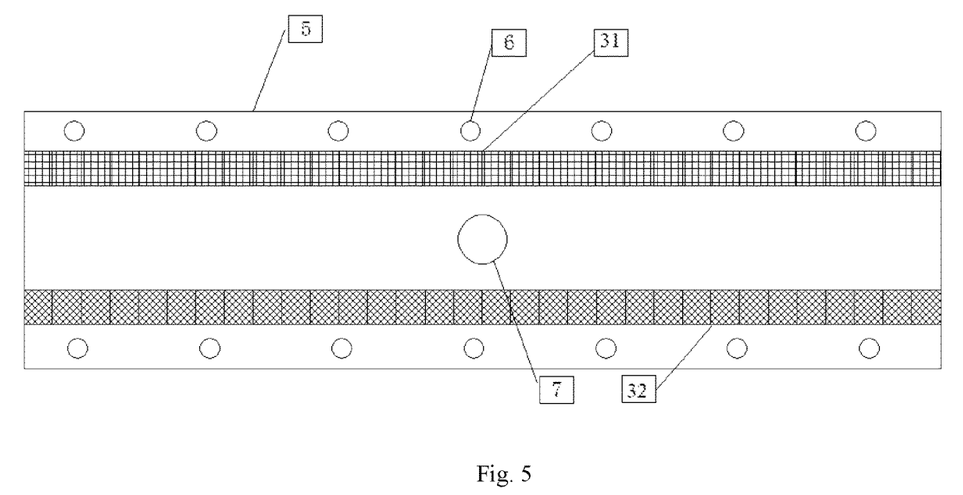
Figure 6:
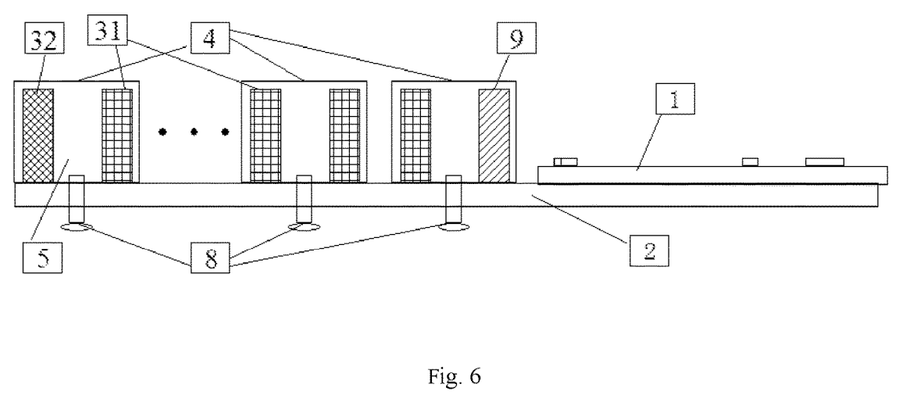
FIG. 6 illustrates a schematic diagram of a detector unit being mounted with a backplane according to some embodiments of the present disclosure.

As shown in FIGS. 4 to 6, a preset number (for example, two) of adjacently arranged detector assemblies 3 are disposed inside one detector housing 4, and are sealed through uniformly distributed sealing mounting holes 6 to form one independent detector unit 5 with an all-sealed structure. The detector unit 5 is also seal mounted with the backplane 2 through a screw hole 7 with a sealed structure by using a screw 8.

The sealed structure makes the scintillator array, photodiodes and related electronic devices in the detector unit 5 isolated from water, air, smoke, fog, and the like in a use environment, which can improve the reliability of the area array detector, and the area array detector can reliably operate for a long time in a place such as a coastal port and the like. The detector unit 5 has an independent sealed structure, and can be added, reduced or replaced without affecting the function of the whole area array detector, and can be assembled into different structures to be applied to different business system needs, and it is more flexible and economical in production and manufacturing.

As shown in FIG. 6, the area array detector further includes a filler assembly 9, the filler can be a lighter substance such as plastic. The filler assembly 9 and a detector assembly 3 arranged adjacent to the filler assembly are disposed inside one detector housing 4 to form one independent detector unit 5 with an all-sealed structure, the detector unit 5 being also seal mounted with the backplane 2. If two detector assemblies 3 adjacently arranged and the detector housing 4 thereof form one independent detector unit 5 with the all-sealed structure, when the number of the detector assemblies 3 is odd, one filler assembly 9 can be provided, and the filler assembly 9 and a detector assembly 3 arranged adjacent to the filler assembly are disposed inside one detector housing 4 to form one independent detector unit 5 with the all-sealed structure.

In addition, in the detector unit 5, a multi-channel current input analog-to-digital converter (ADC) can also be included, for acquiring and digitizing a detection signal from each detector assembly 3.

Figure 7:
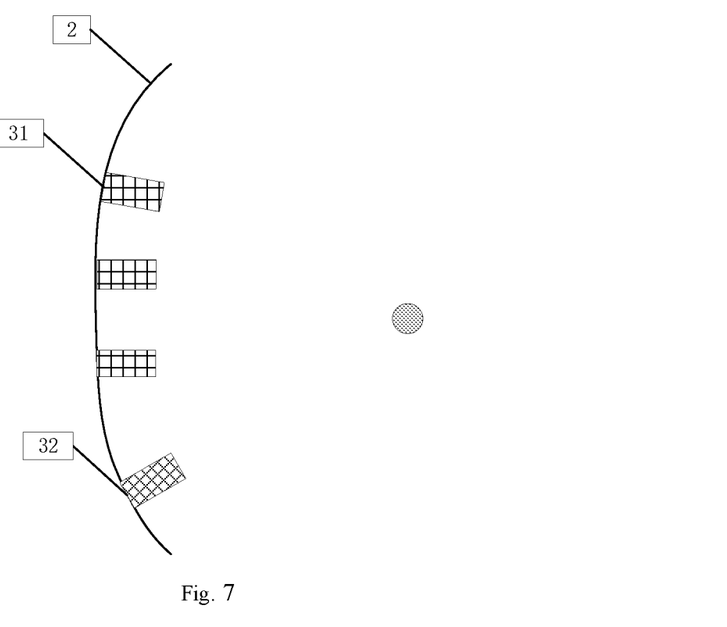
FIG. 7 illustrates a schematic diagram of detector assemblies being arranged on a curved backplane according to some embodiments of the present disclosure.

The backplanes 2 shown in the foregoing embodiments are all planar backplanes, but the backplane 2 can also be a curved backplane. As shown in FIG. 7, in the case that the backplane 2 is a curved backplane, detector assemblies 31 and 32 are arranged on a curved surface of the curved backplane, and detection sensitive surfaces of detector assemblies 31 and 32 are curved and aligned with a ray source located in a central area of the curved surface. This makes ray beams directly irradiated to a pixel center of each detection crystal, and scattering crosstalk is reduced, and imaging quality is improved.

The data acquisition circuit board 1 is configured to acquire detection data of detector assemblies, and according to different scanning modes, output the detection data of the first detector assembly 32 or the detection data of all the detector assemblies 3 for imaging in a corresponding scanning mode.

For example, the data acquisition circuit board 1 is configured to output the detection data of the first detector assembly 32 for DR imaging in a DR scanning mode, which can achieve fast high-quality imaging and can be used for higher-speed scanning, and output the detection data of all the detector assemblies for CT imaging in a CT scanning mode, which can obtain more detection data in a shorter scanning time.

The scanning mode can be switched according to business needs. For example, the DR scanning is performed first, and when there is a suspicious substance difficult to distinguish in an image, the scanning is switched to the CT mode, to reconstruct the image and find a more detailed substance structure. Therefore, the functions of two sets of equipment can be realized by one set of equipment, which can select the working mode according to characteristics of a detected object, and can also simultaneously check and analyze the detected object from two dimensions and three dimensions, to acquire more comprehensive substance information from different dimensions, and it has a higher substance identification capability.

In the case where the scintillator arrays of the first detector assembly 32 and the second detector assembly 31 differ in the pixel size, the data acquisition circuit board 1 is further configured to process the detection data of the first detector assembly 32 and the second detector assembly 31 into the same pixel size by pixel division or pixel combination, before outputting the detection data of all the detector assemblies.

For example, when the first pixel size of the scintillator array of the first detector assembly 32 is ¼ of the second pixel size of the scintillator array of the second detector assembly 31, every 4 pixels corresponding to the detection data of the first detector assembly 32 can be combined into 1 pixel for output, and it is consistent in size with each pixel corresponding to the detection data of the second detector assembly 31, and maintaining the integrity of the CT imaging data, and making the imaging clearer because of the small pixel size when the DR imaging outputs the pixels alone.

The data acquisition circuit board 1 can be implemented, for example, based on an FPGA (Field Programmable Gate Array) or other programmable devices.

Figure 8:
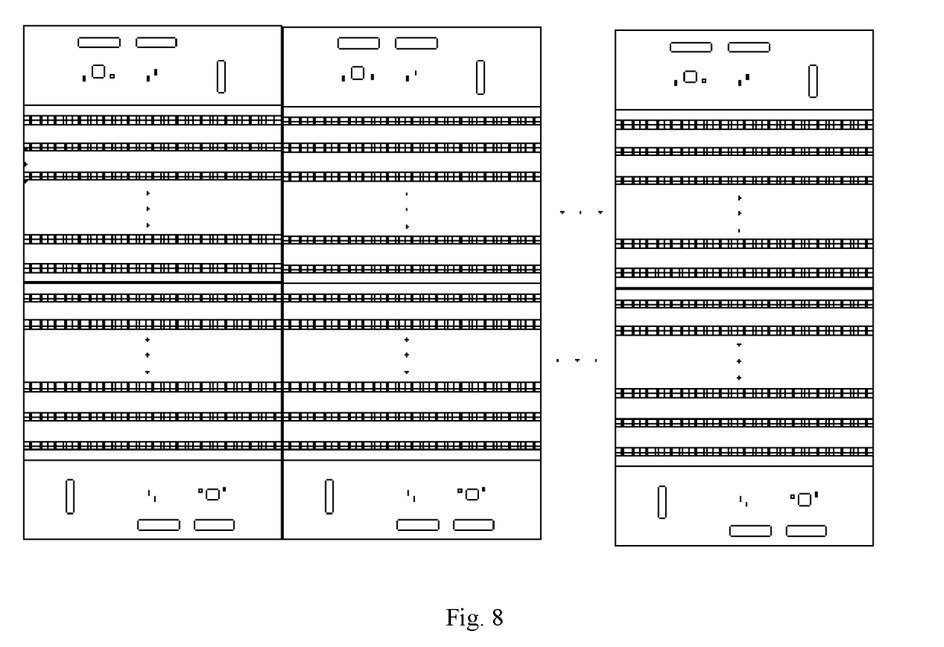
FIG. 8 illustrates a schematic diagram of area array detectors being spliced, combined and arranged according to some embodiments of the present disclosure.

In some embodiments, the area array detectors can also be used in combination, and the area array detectors are spliced into a larger area array detector. As shown in FIG. 8, the area array detectors are horizontally and seamlessly arranged to form an area array with a sufficient length. Therefore, the detection is jointly performed, to obtain more detection data in a shorter scanning time, to have a higher substance identification capability.

The area array detectors in the above embodiments or a combination thereof can be used in a large product such as a container/vehicle inspection system, for example, CT/DR inspection equipment for an X/Gamma ray container/vehicle. That is, the container/vehicle inspection system includes the area array detectors in the above embodiments or the combination thereof. In addition to the area array detectors or the combination thereof, the container/vehicle inspection system can further comprise an accelerator for generating an X ray or Gamma ray with a certain dose and a certain energy, and an image acquisition device for converting an electrical signal output from the area array detector into a digital image signal.

Figure 9:
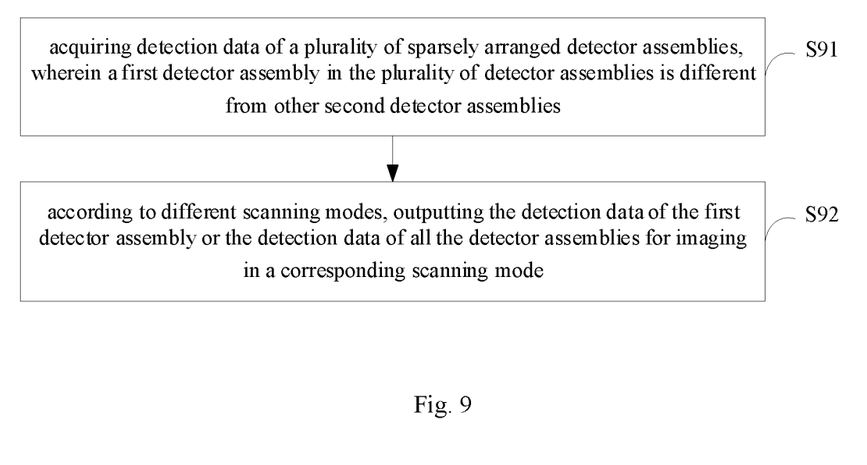
FIG. 9 shows the schematic diagram of the detection method according to some embodiments of the present disclosure.

As shown in FIG. 9, in some embodiments of the present disclosure, there is further provided a corresponding detection method, comprising: acquiring detection data of sparsely arranged detector assemblies, and a first detector assembly in detector assemblies is different from other second detector assemblies (S91); and according to different scanning modes, outputting the detection data of the first detector assembly or the detection data of all the detector assemblies for imaging in a corresponding scanning mode (S92). For example, in the case of a DR scanning mode, the detection data of the first detector assembly is output for DR imaging, and in the case of a CT scanning mode, the detection data of all the detector assemblies is output for CT imaging. In addition, as described above, the scanning mode can be switched according to business needs. For example, the DR scanning is performed first, and is switched to the CT mode for scanning when there is a suspicious substance difficult to distinguish in an image.

The above description are only some embodiments of the present disclosure, and not used for limiting the present disclosure, and any modification, equivalent replacement, improvement, etc. made within the spirit and principles of the present disclosure should be included in the protection scope of the present disclosure.

What is claimed is:

1. An area array detector for a container/vehicle inspection system, comprising:
a plurality of sparsely arranged detector assemblies, wherein a first detector assembly is different from other second detector assemblies;
a backplane for carrying and mounting the plurality of detector assemblies; and
a data acquisition circuit board configured to acquire detection data of the plurality of detector assemblies, and according to different scanning modes, output the detection data of the first detector assembly or the detection data of all the detector assemblies for imaging in a corresponding scanning mode, wherein the detection data of the first detector assembly and the detection data of the second detector assembly are processed into the same pixel size by pixel division or pixel combination, before outputting the detection data of all the detector assemblies.

2. The area array detector according to claim 1, wherein the first detector assembly and the second detector assembly have different scintillator arrays.

3. The area array detector according to claim 1, wherein the scintillator arrays of the first detector assembly and the second detector assembly differ in at least one of a pixel size or material.

4. The area array detector according to claim 1, wherein a preset number of adjacently arranged detector assemblies are disposed inside one detector housing to form one independent detector unit with an all-sealed structure, the detector unit being seal mounted with the backplane.

5. The area array detector according to claim 4, wherein the preset number comprises 2.

6. The area array detector according to claim 4, further comprising: a filler assembly, wherein the filler assembly and a detector assembly arranged adjacent to the filler assembly are disposed inside one detector housing to form one independent detector unit with an all-sealed structure, the detector unit being seal mounted with the backplane.

7. The area array detector according to claim 1, wherein the backplane is a planar backplane or a curved backplane.

8. The area array detector according to claim 7, wherein the plurality of detector assemblies are arranged on a curved surface of the curved backplane, wherein detection sensitive surfaces of the plurality of detector assemblies are curved and aligned with a ray source located in a central area of the curved surface.

9. The area array detector according to claim 3, wherein a first pixel size of a scintillator array of the first detector assembly is less than a second pixel size of the scintillator array of the second detector assembly.

10. The area array detector according to claim 1, wherein a plurality of the area array detectors are spliced into a larger area array detector.

11. The area array detector according to claim 1, wherein the data acquisition circuit board is configured to output the detection data of the first detector assembly for DR imaging in a digital radiography DR scanning mode, and output the detection data of all the detector assemblies for CT imaging in a computed tomography CT scanning mode.

12. A container/vehicle inspection system, comprising an area array detector, comprising:

a plurality of sparsely arranged detector assemblies, wherein a first detector assembly is different from other second detector assemblies;

a backplane for carrying and mounting the plurality of detector assemblies; and a data acquisition circuit board configured to acquire detection data of the plurality of detector assemblies, and according to different scanning modes, output the detection data of the first detector assembly or the detection data of all the detector assemblies for imaging in a corresponding scanning mode, wherein the detection data of the first detector assembly and the detection data of the second detector assembly are processed into the same pixel size by pixel division or pixel combination, before outputting the detection data of all the detector assemblies.

13. The container/vehicle inspection system according to claim 12, wherein the first detector assembly and the second detector assembly have different scintillator arrays.

14. The container/vehicle inspection system according to claim 12, wherein the scintillator arrays of the first detector assembly and the second detector assembly differ in at least one of a pixel size or material.

15. A detection method, comprising:

acquiring detection data of a plurality of sparsely arranged detector assemblies, wherein a first detector assembly in the plurality of detector assemblies is different from other second detector assemblies; and according to different scanning modes, outputting the detection data of the first detector assembly or the detection data of all the detector assemblies for imaging in a corresponding scanning mode, wherein the detection data of the first detector assembly and the detection data of the second detector assembly are processed into the same pixel size by pixel division or pixel combination, before outputting the detection data of all the detector assemblies.

16. The detection method according to claim 15, wherein a DR scanning mode includes the detection data of the first detector assembly that is output for DR imaging, and wherein a CT scanning mode includes the detection data of the detector assemblies that are output for CT imaging.

17. The detection method according to claim 16, wherein the DR scanning mode is performed first, and is switched to the CT scanning mode when a suspicious substance difficult to distinguish is found.

* * * * *